United States Patent [19]
McIntyre et al.

[11] Patent Number: 5,920,405
[45] Date of Patent: Jul. 6, 1999

[54] MULTIFUNCTION DEVICE WITH PRINTER/FACSIMILE CONTENTION SELECTION

[75] Inventors: Lloyd F. McIntyre, Plano; Alan K. Harford, Carrollton, both of Tex.

[73] Assignee: Xerox Corporation, Stamford, Conn.

[21] Appl. No.: 08/402,080

[22] Filed: Mar. 10, 1995

[51] Int. Cl.⁶ ........................................... H04N 1/00
[52] U.S. Cl. ................................................. 358/442
[58] Field of Search .................... 358/442, 468, 358/400, 407, 434–436, 298

[56] References Cited

U.S. PATENT DOCUMENTS

| | | | |
|---|---|---|---|
| 3,597,071 | 8/1971 | Jones | 355/3 |
| 4,623,244 | 11/1986 | Andrews et al. | 355/24 |
| 4,947,345 | 8/1990 | Paradise et al. | 364/519 |
| 4,991,200 | 2/1991 | Lin | 379/100 |
| 5,021,892 | 6/1991 | Kita et al. | 358/468 |
| 5,038,218 | 8/1991 | Matsumoto | 358/296 |
| 5,127,048 | 6/1992 | Press et al. | 379/100 |
| 5,303,067 | 4/1994 | Kang et al. | 358/442 |
| 5,461,488 | 10/1995 | Witek | 358/402 |

OTHER PUBLICATIONS

WinFax Lite User's Guide, Sixth Edition, Delrina Corporation, Jun. 1993.

*Primary Examiner*—Thomas D. Lee
*Assistant Examiner*—Stephen Brinich
*Attorney, Agent, or Firm*—Mark Costello

[57] ABSTRACT

A multifunction device, having a single printer and data access thereto for jobs generated at a connected computer and jobs received via a telephone or scanner or facsimile memory. In such a device, a user interface is provided facilitating a choice of contention schemes giving priority to job printing based on job type or source including: 1) no access to the printer; 2) computer-only access; 3) computer and facsimile scanner access. Where computer and facsimile access is selected, additional choices for contention are provided, including a) facsimile priority or b) computer priority. Where a job type denied access is received, it may be stored in device storage until such time as it is individually accessed or until the contention scheme is changed to allow favorable queuing of the job.

3 Claims, 3 Drawing Sheets

MULTIFUNCTION DEVICE WITH PRINTER/FACSIMILE CONTENTION SELECTION

The present invention is directed to a multifunctional document processing systems with control of printer access to any job source and specific jobs source, and more particularly, to a multifunction machine contention control scheme, controllable via a simplified user interface.

BACKGROUND OF THE INVENTION

Standard facsimile devices which operate only as facsimile machines connected directly to a telephone line are rapidly being replaced by devices which combined facsimile and/or digital scanning, copying and printing in one single unit. Note, e.g., U.S. Pat. Nos. 4,947,345 to Paradise; 3,597,071 to Jones; 5,038,218 to Matsumoto; 5,021,892 to Kita, et al.; and 4,623,244 to Andrews, et al. One class of these devices may conveniently be directly connected to a personal computer or workstation to provide printing, and to a telephone access line to provide facsimile transmission and receipt.

When a multifunction system has multiple job sources (e.g., a telephone line, a printer cable and/or a scanner input), a contention arrangement is required to control access to the system printer. Generally, multiple jobs are placed in a waiting list or queue. There are many ways to prioritize queues, based on time of receipt, job-type, available resources, user codes, etc. U.S. Pat. No. 4,947,345 to Paradise et al. shows one prioritization scheme, which assumes that facsimile messages are usually very important and should receive high priority in the job queues requiring utilizing the printer. Fortunately, the class of multifunction machines in which such features are appearing are increasing in processing power and memory. Job storage is available, to postpone printing until such time as a processor, operating in accordance with a preprogrammed routine, directs a job to a printer. Paradise et al. illustrates a choice of 1) a FIFO printing mode (jobs are printed in the order received) 2) a Hold FAX mode in which only print and copy jobs are printed and 3) a Release FAX mode in which Fax jobs are removed from the main FIFO queue and then directed back to the queue for printing ahead of any copy or print jobs (LIFO). While such a system would work well in some environments, it would not meet all user expectations.

It would be highly desirable to provide a flexible contention management system in which facsimile jobs and print jobs could be selectively chosen for priority printing based on user preference. Additionally, it would be highly desirable to provide a simplified user interface accommodating such selection.

References disclosed herein are incorporated by reference for their teachings.

SUMMARY OF THE INVENTION

The present invention is directed to a multifunction device, having a single printer and data access thereto for jobs generated at a connected printer and jobs received via a telephone connection. In such a device, a user interface is provided facilitating a choice of contention schemes giving priority to job printing based on job type or source including: 1) no access to the printer; 2) computer-only access; 3) computer and facsimile access. Where computer and facsimile access is selected, additional choices for contention are provided, including a) facsimile priority or b) computer priority. Optionally, a third choice, c) FIFO priority may also be provided. Where a job type denied access is received, it may be stored in device storage until such time as it is individually accessed or until the contention scheme is changed to allow favorable queuing of the job.

It is clear that, particularly in lower speed devices, there will be times when a user will want full time, immediate access to the printer, e.g., during development of a document at the attached computer workstation. In such a case, it will be desirable for print jobs to be immediately printed, or printed without delay for printing other non-critical documents. At other times, it may be desirable for facsimile jobs, which commonly are treated as urgent matters, to be printed immediately. Alternatively, it may be desirable to have a FIFO type scheme, where any job received is held until the prior job is complete. The present invention suggests a user interface allowing selection of various contention schemes.

These and other aspects of the invention will become apparent from the following description, the description being used to illustrate a preferred embodiment of the invention when read in conjunction with the accompanying drawings.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
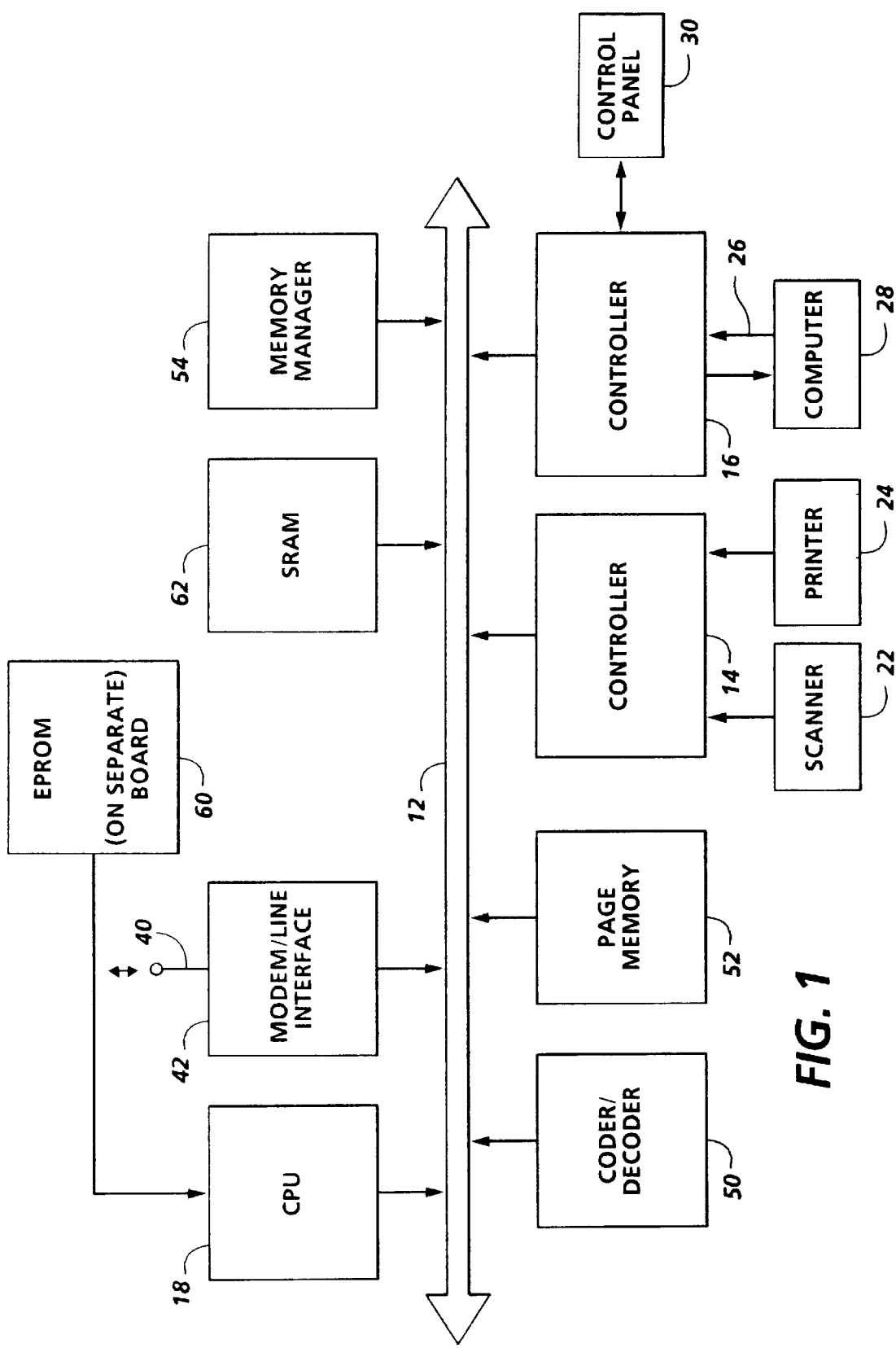
FIG. 1 is a block diagram depicting a multifunctional document processing machine.

Referring to FIG. 1, a multifunctional document processing system is referenced generally as numeral 10. A system bus 12 provides for communication between components. Device control is distributed between two programmable controllers, hereinafter first controller 14 and second controller 16. A central processing unit (CPU) 18 includes a third programmable controller which serves to provide control of the overall system processing. Scanner 22 and printer 24 are connected to the system via first processor 18. The printer 24, generates whatever hard copy is required. In one embodiment, this printer is an ink jet printer. Scanner 22 is included to provide full facsimile and/or copier functions. The system is operative to process electronic document signals directed thereto via second controller 16 by serial, parallel or SCSI connection 26 from an external personal computer or workstation 28. Second processor 16 may support an additional outward connection 29 from the system to the personal computer 28 for passing scanned data thereto. Second controller 16 additionally provides control for a user interface/control panel (UI) 30 for the system. Second controller 16 also receives the outputs of the systems machine sensors, and provides control of the mechanical components of the system, and particularly the paper transport systems. It will no doubt be appreciated that instead of a personal computer, a network connection or network server could be substituted, to provide network operation.

Facsimile communication is provided for system 10 via a telephone line 40 and fax modem 42. Decoding and encoding of facsimile transmissions is provided by coder/decoder 50. Page memory 52 is provided, having storage capability for storing electronic document signals corresponding to at least several pages. Conveniently, it is DRAM-type memory.

Access to the memory is controlled by memory manager 54, which in turn is controlled by CPU 18.

Programming information is stored in EPROM 60, and SRAM 62.

One possible embodiment of the invention allows the use of CPU 18 to control access to a data bus 12, on which image information and control information flow. In such an arrangement, a facsimile transmission can be received by the document process system 10 at telephone line 40 and fax modem 42, and directed either directly to printer 24, via first controller 14, or to page memory 52. Information stored at page memory 52 can be directed to printer 24. Information from computer 28 can be directed via connection 26 to second controller 16 to either page memory 52 or printer 24. Scanned data from scanner 22 can be directed via first controller 14 either to page memory 52 (which is particularly useful in the case of precollation) or to printer 20.

Figure 2:
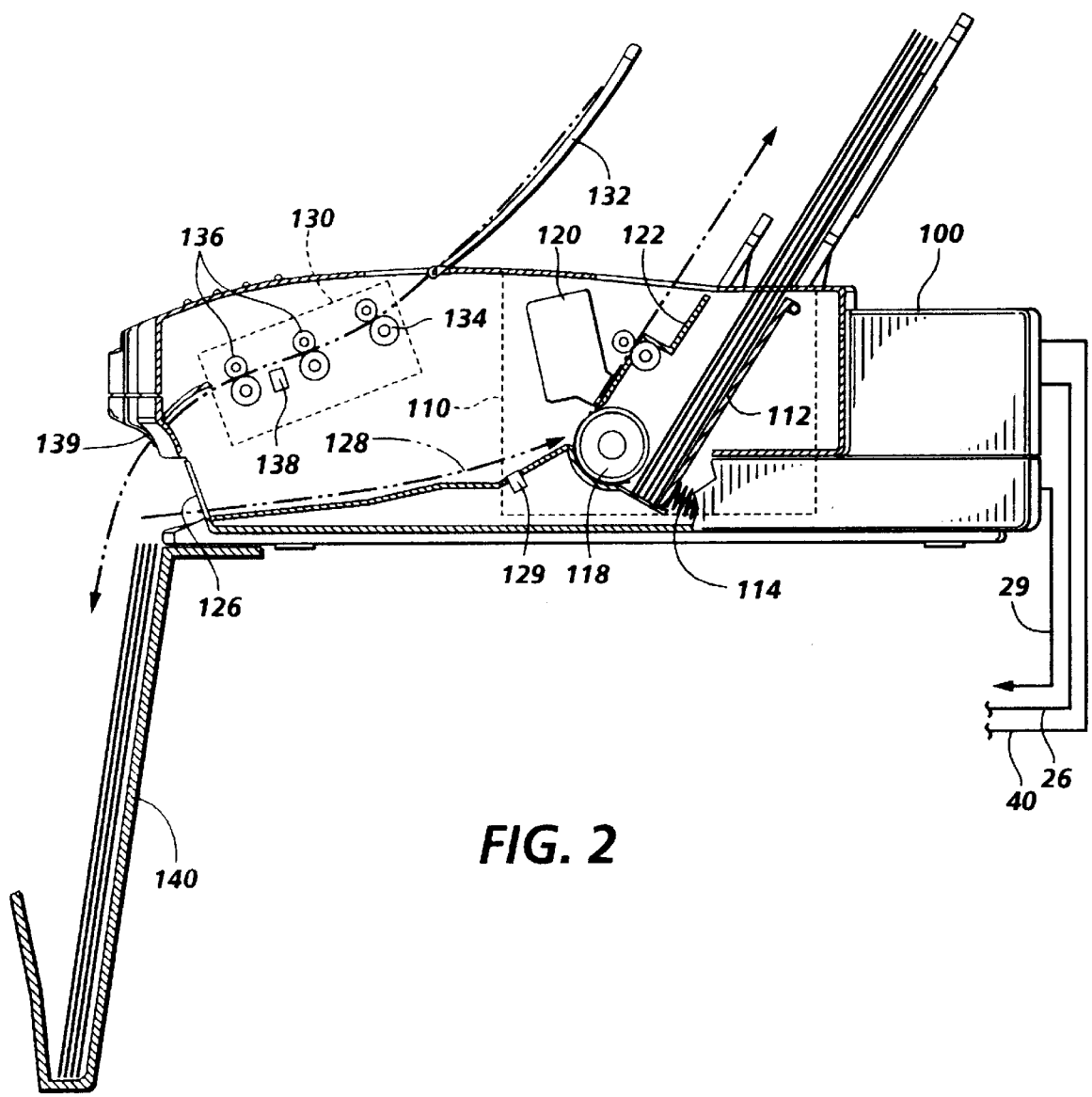
FIG. 2 is a somewhat schematic view of the operational elements of the multifunctional document processing means.

With reference now to FIG. 2, a highly simplified and schematic view of the machine is illustrated. Within housing 100 is supported the circuits described in FIG. 1, a scanner, printer, paper transports and appropriate connections to external functions. Within dotted line 110 are illustrated the mechanical elements of printer 24. Included are input paper tray 112, with an appropriate tray elevator 114. For printing, sheets are fed from tray 112 by a roll feeding arrangement 118, which advances sheets from the tray. As the sheet is wrapped past feed roller 118, an ink jet printing system 120 deposits ink in image configuration a swath at a time. Further details with respect to thermal ink jet printing devices are available at U.S. Pat. No. 4,638,337 to Torpey et al., and U.S. patent application Ser. No. 08/081,898 entitled, "Method and Apparatus for Maintaining Constant Drop Size Mass in Thermal Ink Jet Printers," by J. Stephany which illustrate a multi-color ink jet printer. Upon completion of printing, the documents continue to advance until they are deposited in output tray 122.

For printing on stock which is not suitable for stacking in input paper tray 112, a bypass path is provided, entering the machine at bypass entry 126. A sheet path 128 is defined by paper guides (not shown). In this embodiment, stock is manually inserted until it is engaged at the feed roller 118. A sensor 129, senses the presence of bypass stock and signals controller 16 (FIG. 1) to start operation of the feed roller for advancing the stock past the printer.

Within the dotted line 130, are illustrated the mechanical components of the scanner 22. Included are input document tray 132, with retard feeder 134, feeding documents seriatim from tray 132. Documents are advanced to CVT arrangement 136, whereat the documents will pass a full width scanning element, with appropriate illumination and optics, indicated generally by 138. The scanned documents are directed to an exit 138, from which they are gravity stacked in an output document tray 140.

Figure 3:
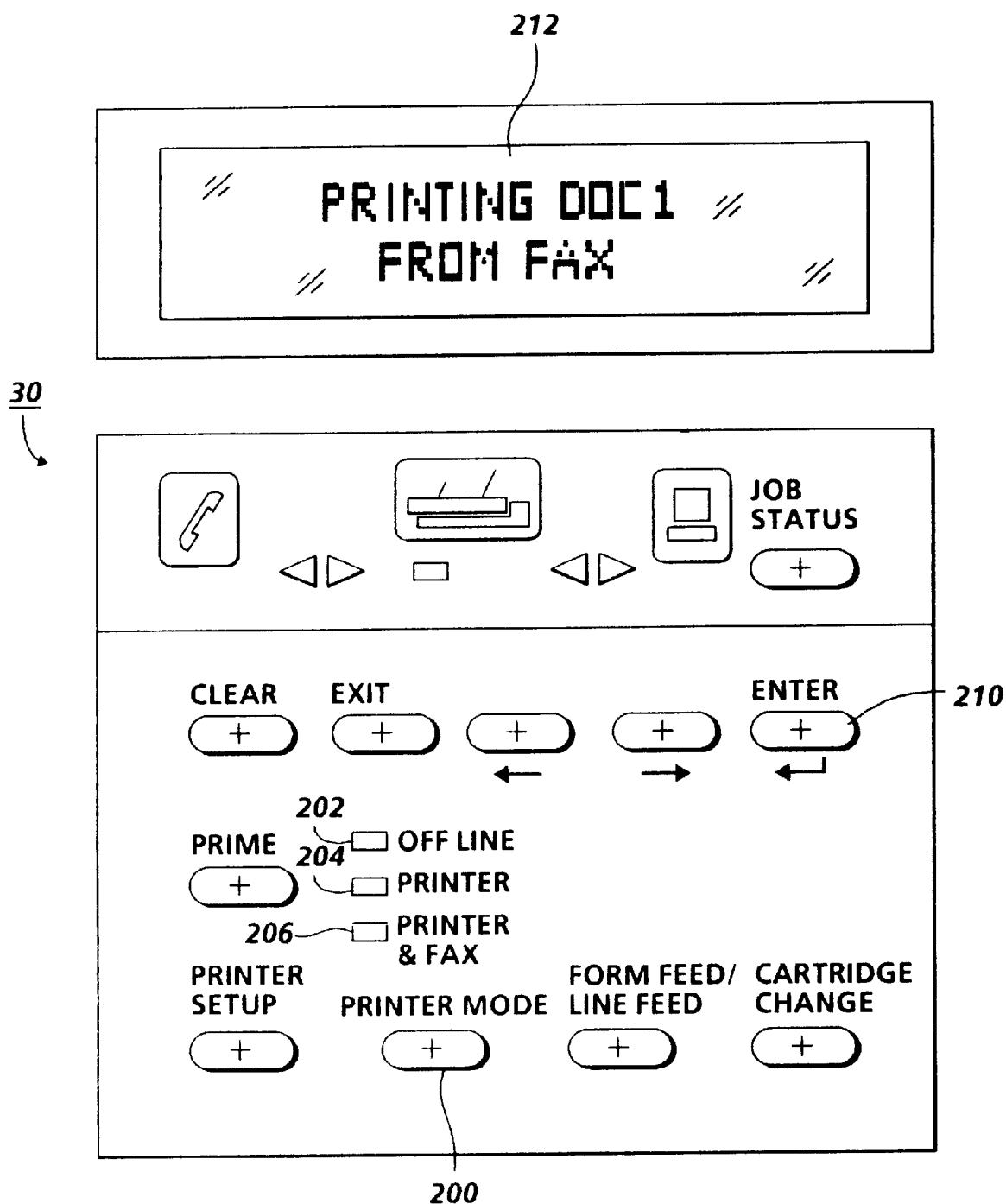
FIG. 3 illustrates a user interface controlling the job contention scheme in the document processing machine.

With reference now to FIG. 3, there is shown a relevant portion of UI 30 useful in the present invention. Print Mode button 200, is a switching arrangement which toggles the condition of the Print Mode Selection between three conditions: Off Line, Printer, or Printer & Fax. The condition selected is displayed by respectively providing LED's 202, 204 and 206 adjacent labels indicating the condition to be selected, with an ON state of the LED indicating the selected condition. Job status button 210 causes CPU 18 to direct a brief description and status of of any job in the system to be displayed on an LED or LCD alphanumeric display 212.

Off Line, as used herein, is a state where the printer will not receive a print job. Its primary purpose is to allow testing, calibration or parameter changes without interruption.

Printer, as used herein, is a state where the printer will receive only jobs from the computer or workstation connected to the system via the parallel, serial or SCSI port (hereinafter, these will be called "printer jobs"). During this time, facsimile jobs received are buffered to page memory 52 (FIG. 1) until such time as the condition of the Print Mode Selection switch is changed.

Printer & Fax, as used herein, is a state where the printer will receive printer jobs from computer or workstation 28 (FIG. 1) connected to the system via the parallel, serial or SCSI port or facsimile jobs on a FIFO contention basis. In this embodiment, facsimile jobs include facsimile transmissions received at the modem or if the printer is available, copies scanned at the scanner, or documents stored in memory, or from any source (including facsimile transmissions stored in memory), and reports stored in SRAM 62.

With reference to FIG. 1, contention, as used herein refers to the allocation of printer control to a device function on the basis of a predetermined priority. In the present case, two device functions compete for access to the printer: the facsimile and the computer. When the system enters the Printer & Fax state, a First In/First Out mode of operation is entered. In the context of the present invention, FIFO refers to the following specific process. Facsimile jobs include documents received from either telephone line 40, memory 52 or scanner 22 and directed to printer 24. Each job is processed in a manner that maintains access to printer 24 until the job, even if it a multipaged job, is complete. However, computer jobs appear to printer 24 to be a sequence of single page jobs, because there is no protocol that tells a printer that a next page is coming from a computer, or that a multipage job is not complete. Accordingly, the second controller 16 retains access to printer 24 for printer jobs for a predetermined time, perhaps 15 seconds, after the completion of each page, to assure that there is no additional page on its way from computer 28. After 15 seconds, controller 16 gives up access to printer 24 for standard FIFO contention. This predetermined time is programmable to user requirements.

Where computer and facsimile access is selected, two possible contention modes are provided by the present embodiment including a) facsimile priority, printing all documents which the facsimile controller has ready to be printed before giving access to the printer, or b) computer access, upon completion of printing any currently printing facsimile document, regardless of how many facsimile documents are in queue for printing. Where a job type denied access is received, it may stored in device storage until such time as it is individually accessed or until the contention scheme is changed to allow favorable queuing of the job.

A straightforward application of the present invention is as follows, with reference to FIGS. 1, 2 and 3. In a given situation, a final format document may be directed to the document processing system from the computer. The source of this document may be the computer word processor, the document processing system scanner, or a downloaded facsimile transmission, which has been stored in the computer memory (which may be much larger than the document processing system memory. The operator has a plan to copy the document onto one or more transparencies. It is clearly undesirable to load transparencies into sheet tray 112, because, at any time, a facsimile from an external source might be received, and it would be undesirable to print a fax onto a transparency, unless that is peculiarly desired. Accordingly, the operator uses the Print mode button 200 at UI 30, to place the machine into Printer state.

In this mode, facsimile documents are received to memory, while the printer is dedicated to receiving print jobs. Transparencies are placed into bypass path 128, and a printer ready signal is directed back to the computer in a standard manner when the transparency is detected by sensor 129. Upon completing the print job, it is likely that the operator will use the Print mode button 200 at Ul 30, to place the machine into the Print & Fax mode.

While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

We claim:

1. A multifunctional document processing system having a facsimile mode and a computer printer mode, including:

a printer, responsive to signals directed thereto to produce an image on a sheet;

a user interface, allowing the selection of a printer only mode or a printer & facsimile mode;

a facsimile circuit receiving facsimile transmissions and directing signals indicative thereof to the printer, including:

a facsimile modem, a first controller, a facsimile job memory, and an external telephone line connection suitable to receive facsimile transmissions;

a printer circuit receiving signals from an external data source, including a second controller, and an external data communication line suitable to receive print jobs;

a third controller, responsive to the user interface selection of a printer only mode or a printer & facsimile mode to prevent access to the printer by the facsimile circuit when printer only mode is selected, and allowing first in, first out access to the printer by the facsimile when printer & facsimile mode is selected.

2. The multifunctional document processing system described in claim 1, wherein the user interface additionally provides selection of an Off Line mode; and said third controller operable in response to user interface selection of an Off Line mode prevents access to the printer by both of the facsimile circuit and the printer circuit when Off Line mode is selected.

3. The multifunctional document processing system described in claim 1, wherein the facsimile controller directs signals from either of the facsimile modem or an integral scanner to the facsimile job memory, during printer only mode.

* * * * *